United States Patent
Zhodzishsky et al.

(10) Patent No.: US 8,260,248 B2
(45) Date of Patent: Sep. 4, 2012

(54) METHOD AND SYSTEM FOR AUTOMATICALLY ESTABLISHING A DIAL-UP CONNECTION TO A NETWORK THROUGH A MOBILE DEVICE

(75) Inventors: Victor Zhodzishsky, Potomac, MD (US); Ron Wong, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 1071 days.

(21) Appl. No.: 11/881,689

(22) Filed: Jul. 27, 2007

(65) Prior Publication Data

US 2009/0029655 A1 Jan. 29, 2009

(51) Int. Cl.
*H04M 11/00* (2006.01)
(52) U.S. Cl. ........................ 455/403; 370/338
(58) Field of Classification Search ................. 455/403; 370/338
See application file for complete search history.

(56) References Cited

U.S. PATENT DOCUMENTS

| | | | |
|---|---|---|---|
| 2002/0115475 A1* | 8/2002 | Abrol et al. | 455/564 |
| 2004/0054794 A1* | 3/2004 | Lantto et al. | 709/229 |
| 2005/0083899 A1* | 4/2005 | Babbar et al. | 370/342 |
| 2007/0010244 A1* | 1/2007 | Tanaka et al. | 455/425 |
| 2007/0049250 A1* | 3/2007 | Chambers et al. | 455/411 |

* cited by examiner

*Primary Examiner* — Marcos Batista
(74) *Attorney, Agent, or Firm* — Farjami & Farjami LLP

(57) ABSTRACT

There is provided a method for use by a computing device for automatically establishing a dial-up connection to a network through a mobile device. The method includes establishing a communication link with a mobile device. For example, the mobile device can be a cellular telephone and the communication link can be a Bluetooth communication link. The method further includes receiving network identification data from the mobile device, where the network identification data indicates the type of the network, e.g., Global System for Mobile ("GSM") communications or Code Division Multiple Access ("CDMA"). The method further includes configuring a dial-up connection entry in the computing device and configuring connection entry in the mobile device based on the type of the network, and establishing the dial-up connection to the network using the dial-up connection entry.

18 Claims, 3 Drawing Sheets

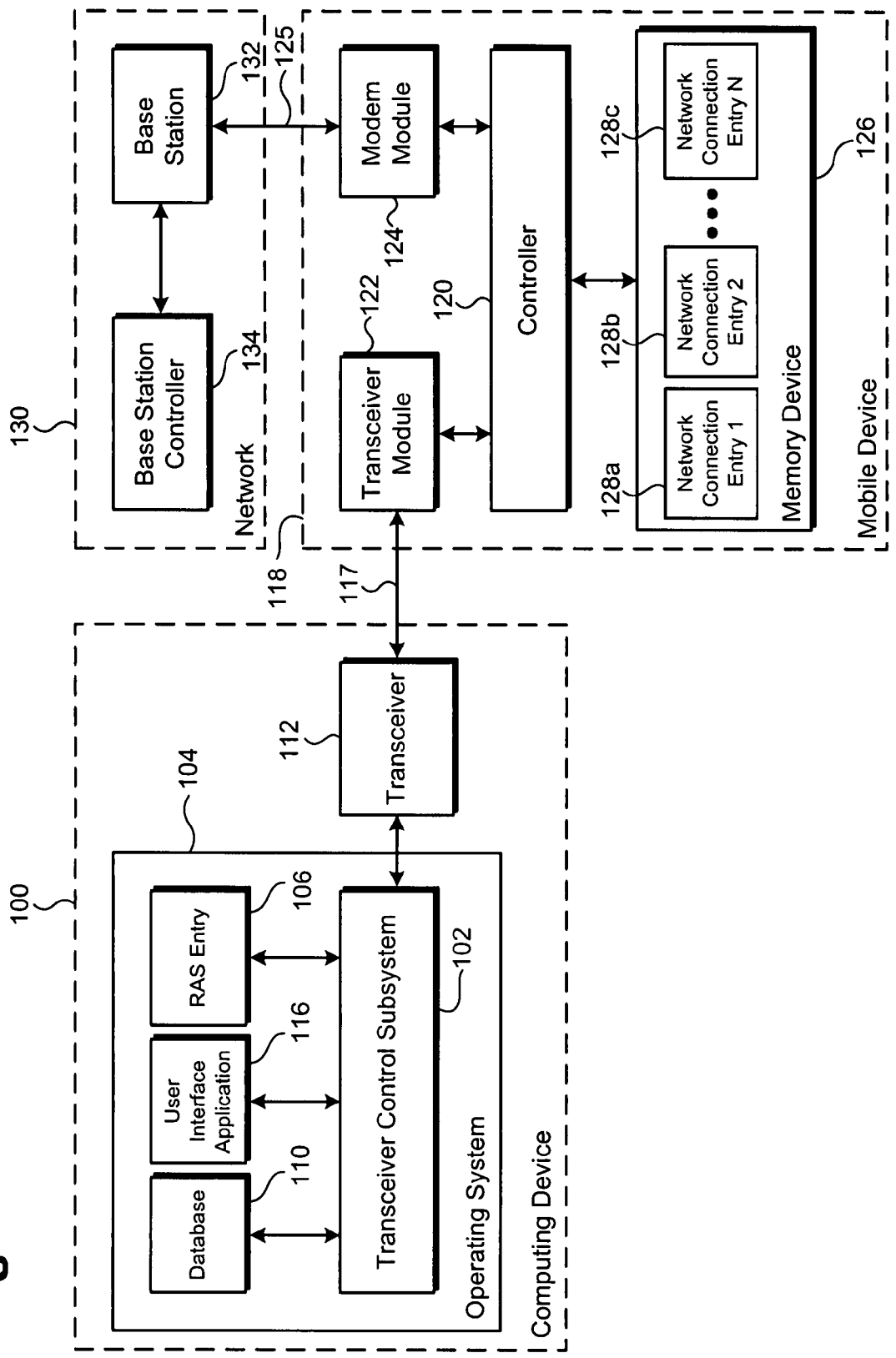

METHOD AND SYSTEM FOR AUTOMATICALLY ESTABLISHING A DIAL-UP CONNECTION TO A NETWORK THROUGH A MOBILE DEVICE

BACKGROUND OF THE INVENTION

1. Field of the Invention

The present invention relates generally to techniques for establishing a dial-up connection to a network. More particularly, the present invention relates to techniques for establishing a dial-up connection to a network through a mobile communication device.

2. Background Art

A computing device, such as laptop or desktop computer, can use a dial-up connection to advantageously access the Internet or other networks through a mobile device. The mobile device can be, for example, a cellular telephone that can transmit and receive data over a cellular network. Thus, a dial-up connection can allow a user to conveniently access the Internet over a wide variety of locations. Moreover, the advent of high-speed and low-cost wireless communication technologies, such as Bluetooth, has significantly increased the number of users that utilize dial-up connections to access the Internet through their mobile devices.

However, when a user of a computing device desires to establish a dial-up connection to a network through a mobile device, the user is required to begin by establishing a communication link (e.g., a Bluetooth communication link) with the mobile device, and then manually configuring a dial-up connection entry (also referred to in the art as a "dial-up connection profile") in the operating system of the computing device and network connection settings in the mobile device. For example, the user may need to configure GPRS settings in the mobile phone, and configure a dial-up connection entry in the computing device. Today, the user is required to manually populate several fields with network specific information, such as a dial string for connecting to the network, a user name, a password, and an Access Point Name ("APN"). Such manual configuration of the mobile phone and a dial-up connection entry is extremely difficult for novice users, and even very inconvenient to knowledgeable users.

SUMMARY OF THE INVENTION

There is provided methods and systems for automatically establishing a dial-up connection to a network through a mobile device, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein:

FIG. 1 illustrates a diagram of a computing device configured to automatically establish a dial-up connection to a network through a mobile device, according to one embodiment of the present invention.

DETAILED DESCRIPTION OF THE INVENTION

Figure 2A:
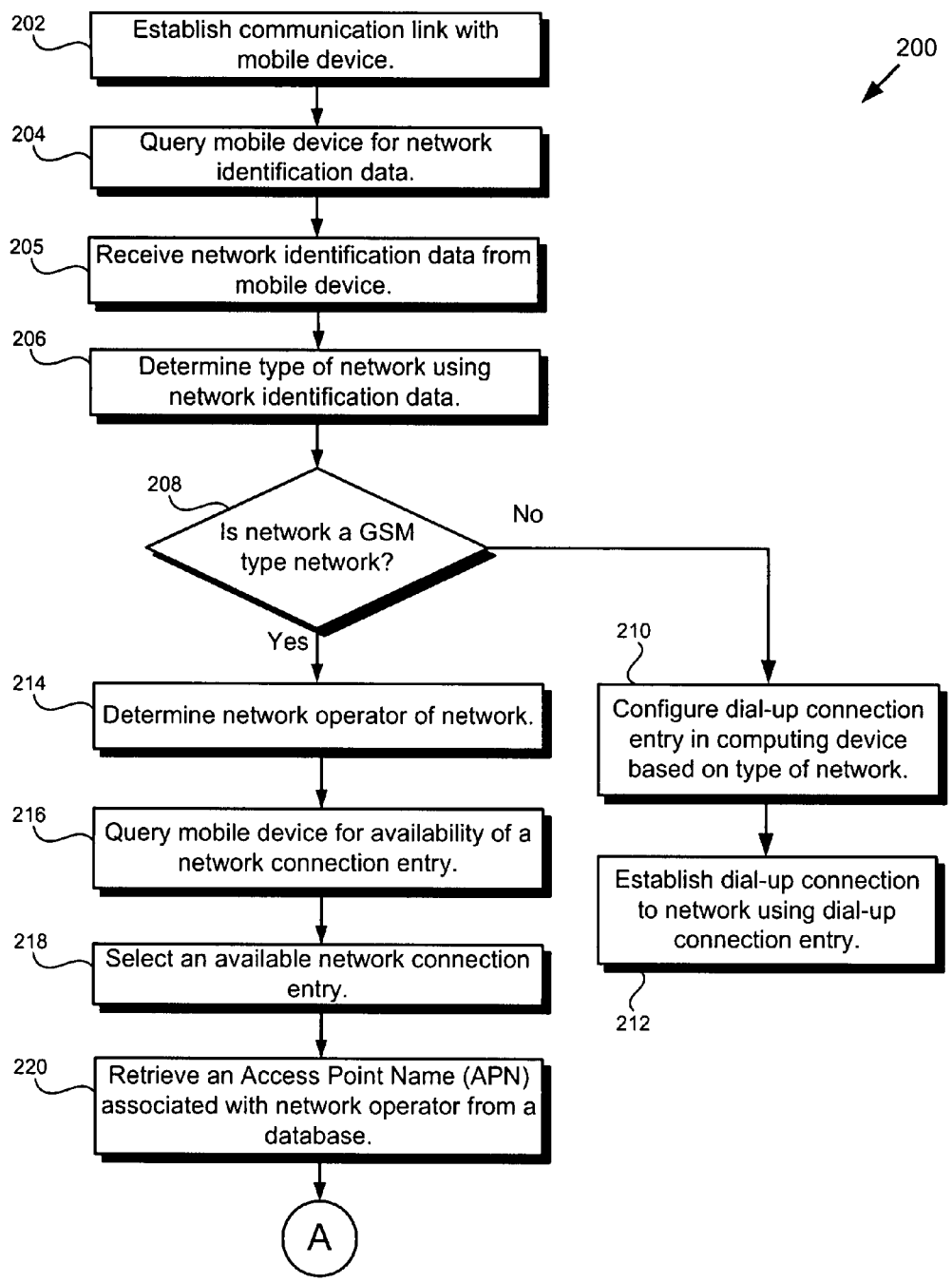
FIGS. 2A and 2B illustrate a flowchart of a method for use by a computing device for automatically establishing a dial-up connection to a network through a mobile device, according to one embodiment of the present invention.

Although the invention is described with respect to specific embodiments, the principles of the invention, as defined by the claims appended herein, can obviously be applied beyond the specifically described embodiments of the invention described herein. Moreover, in the description of the present invention, certain details have been left out in order to not obscure the inventive aspects of the invention. The details left out are within the knowledge of a person of ordinary skill in the art.

The drawings in the present application and their accompanying detailed description are directed to merely example embodiments of the invention. To maintain brevity, other embodiments of the invention which use the principles of the present invention are not specifically described in the present application and are not specifically illustrated by the present drawings. It should be borne in mind that, unless noted otherwise, like or corresponding elements among the figures may be indicated by like or corresponding reference numerals.

FIG. 1 illustrates a diagram of a computing device configured to automatically establish a dial-up connection to a network through a mobile device, according to one embodiment of the present invention. Computing device 100 includes transceiver control subsystem 102 running on operating system 104, database 110, user interface application 116, and transceiver 112. Computing device 100 in FIG. 1 can be, for example, a desktop computer or a laptop computer.

As shown in FIG. 1, transceiver control subsystem 102 provides main logic and controls transceiver 112. Transceiver control subsystem 102 may include multiple software drivers and applications. Transceiver 112 can be, for example, a Bluetooth transceiver, a Universal Serial Bus ("USB") transceiver, or an Infrared Data Association ("IrDA") transceiver. As also shown in FIG. 1, operating system 104 can provide a graphical user interface ("GUI") for controlling computing device 100. In one embodiment, operating system 104 is a commercially available operating system, such as Microsoft Windows.

As shown in FIG. 1, computing device 100 is in communication with mobile device 118. In one embodiment, mobile device 118 can be a mobile communication device, such as a cellular telephone. As shown in FIG. 1, mobile device 118 includes controller 120, transceiver module 122, modem module 124, and memory device 126. In the embodiment shown in FIG. 1, transceiver module 122, modem module 124, and memory device 126 are all coupled to controller 120. Controller 120 can be, for example, a central processing unit ("CPU") or a microcontroller. Transceiver module 122 can be, for example, a Bluetooth transceiver, a Universal Serial Bus ("USB") transceiver, or an Infrared Data Association ("IrDA") transceiver. In one embodiment, modem module 124 can include a cellular telephone transceiver configured to receive and transmit data over a network, such as network 130.

As further shown in FIG. 1, mobile device 118 is in communication with network 130. Network 130 can be, for example, one of several types of cellular networks, such as a Global System for Mobile ("GSM") communications network or a Code Division Multiple Access ("CDMA") network. As shown in FIG. 1, network 130 includes base station 132 and base station controller 134. In one embodiment, modem module 124 can establish a network connection (i.e., network connection 125) with base station 132, thereby allowing modem module 124 to communicate data to and from network 130 over network connection 125.

Unlike the cumbersome approach of the conventional approach for configuring a dial-up connection entry, which requires a manual population various fields of a dialogue box with network specific information by the user, according to the embodiment of FIG. 1, computing device 100 can be configured to automatically establish a dial-up connection to network 130 through mobile device 118. In one embodiment, user interface application 116 can be initiated by clicking an icon associated with user interface application 116 in operating system 104. After initiating user interface application 116 by a user, user interface application 116 can begin by controlling transceiver module 112 through transceiver control subsystem 102 to establish a communication link (i.e., communication link 117) between transceiver module 112 and transceiver module 122. In one embodiment, and as discussed above, transceivers 112 and 122 can be Bluetooth transceivers and communication link 117 can be a Bluetooth communication link.

Thereafter, transceiver control subsystem 102 may query modem module 124 in mobile device 118 for network identification data over communication link 117. In one embodiment, transceiver control subsystem 102 can query modem module 124 using commands from the Hayes modem command set (also referred to in the art as "AT commands"). For example, transceiver control subsystem 102 can be configured to query modem module 124 for network identification data by transmitting an appropriate AT command to mobile device 118. Modem module 124 can then reply with the requested network identification data. In one embodiment, the network identification data indicates the type of network 130. For example, the network identification data can be used by transceiver control subsystem 102 to determine whether network 130 is a GSM communications network or a CDMA network.

If transceiver control subsystem 102 determines that network 130 is a network other than a GSM network, such as a CDMA network, then transceiver control subsystem 102 can proceed to configure a dial-up connection entry in operating system 104 based on the type of network 130. In one embodiment, the dial-up connection entry can be a Remote Access Server ("RAS") entry (e.g., RAS entry 106 in FIG. 1) as provided by the Microsoft Windows operating system. In one embodiment, user transceiver control subsystem 102 can create RAS entry 106. Thus, in the case of a CDMA network, user interface application 116 can configure RAS entry 106 with an appropriate dial string, which can be dialed by modem module 124 to establish a network connection between mobile device 118 and network 130. For example, the dial string can be "#777." Transceiver control subsystem 102 can then establish a dial-up connection to network 130 by dialing RAS entry 106, which can command modem module 124 to dial the abovementioned dial string using an appropriate AT command.

If transceiver control subsystem 102 determines that network 130 is a GSM network, then transceiver control subsystem 102 can proceed to determine the network operator of network 130. In one embodiment, user interface application 116 can determine the network operator (e.g., Cingular Wireless, T-Mobile, etc.) of network 130 by querying modem module 124 using an appropriate AT command. In one embodiment, network 130 can provide access to a General Packet Radio Service ("GPRS") network, which can enable data communications in the GSM type network.

After determining the network operator of network 130, user transceiver control subsystem 102 can determine whether there are any available network connection entries in mobile device 118 that can be used for connecting to the abovementioned GPRS network. In one embodiment, user interface application 116 can determine if there are any available network connection entries in mobile device 118 by querying modem module 124 using an appropriate AT command. For example, an available network connection entry can be a network connection entry which has not previously been configured or which is not in use. As shown in FIG. 1, mobile device 118 can include a number of network connection entries (i.e., network connection entries 128a, 128b, and 128c) that can be stored in memory device 126 of mobile device 118. In one embodiment, memory device 126 can be a Subscriber Identity Module (also referred to in the art as a "SIM card"). Thus, network connection entries 128a and 128b shown in FIG. 1 represent the first and second network connection entries in mobile device 118, and network connection entry 128c represents the nth network connection entry. In one embodiment, each network connection entry in mobile device 118 can store various GPRS settings, which can be used by modem module 124 to establish a network connection to a GPRS network. For example, network connection entry 128a might store various GPRS settings, such as a user name, a password, and an Access Point Name ("APN").

Once the available network connection entries in mobile device 118 have been determined, transceiver control subsystem 102 can select that network connection entry. In one embodiment, transceiver control subsystem 102 can include a database 110 that includes the names of various network operators and the proper GPRS settings associated with each network operator. Accordingly, in one embodiment, transceiver control subsystem 102 can retrieve the proper GPRS settings associated with the network operator of network 130 from database 110. For example, transceiver control subsystem 102 can be configured to retrieve a user name, a password, and the APN associated with the network operator of network 130. Thereafter, user interface application 116 can configure the available network connection entry with the GPRS settings retrieved from database 110. For example, user interface application 116 can configure the available network connection entry with the user name, password, and APN retrieved from database 110. It is important to note that in other embodiments, the GPRS settings associated with each network operator can include greater or fewer GPRS settings than the GPRS settings described above (i.e., user name, password, and APN), without departing from the scope of the invention. For example, if a network operator does not require the use of a user name and password, the GPRS settings associated with that network operator stored in database 110 may include only an APN.

In one embodiment, transceiver control subsystem 102 may use AT commands to configure network connection entry 128c in mobile device 118. After configuring the available network connection entry in mobile device 118, transceiver control subsystem 102 can proceed to configure a dial-up connection entry (e.g., RAS entry 106) in operating system 104. In one embodiment, RAS entry 106 is configured by transceiver control subsystem 102 to use the available network connection entry in mobile device 118 to initiate a network connection between mobile device 118 and network 130. User interface application 116 may configure RAS entry 106 to transmit an appropriate AT command to modem module 124, which causes modem module 124 to establish a network connection with network 130 using the available network connection entry. For example, if the available network connection entry mentioned above is network connection entry 2 (i.e., network connection entry 128b) shown in FIG. 1, then user interface application 116 can configure RAS entry 106 to transmit the AT command "ATDT*99***2#," which can cause modem module 124 to dial the dial string "*99***2#" to establish a network connection with network 130 using the GPRS settings in network connection entry 2.

After configuring RAS entry 106 as described above, transceiver control subsystem 102 can then automatically establish a dial-up connection to network 130 through mobile device 118 by dialing RAS entry 106.

Figure 2B:
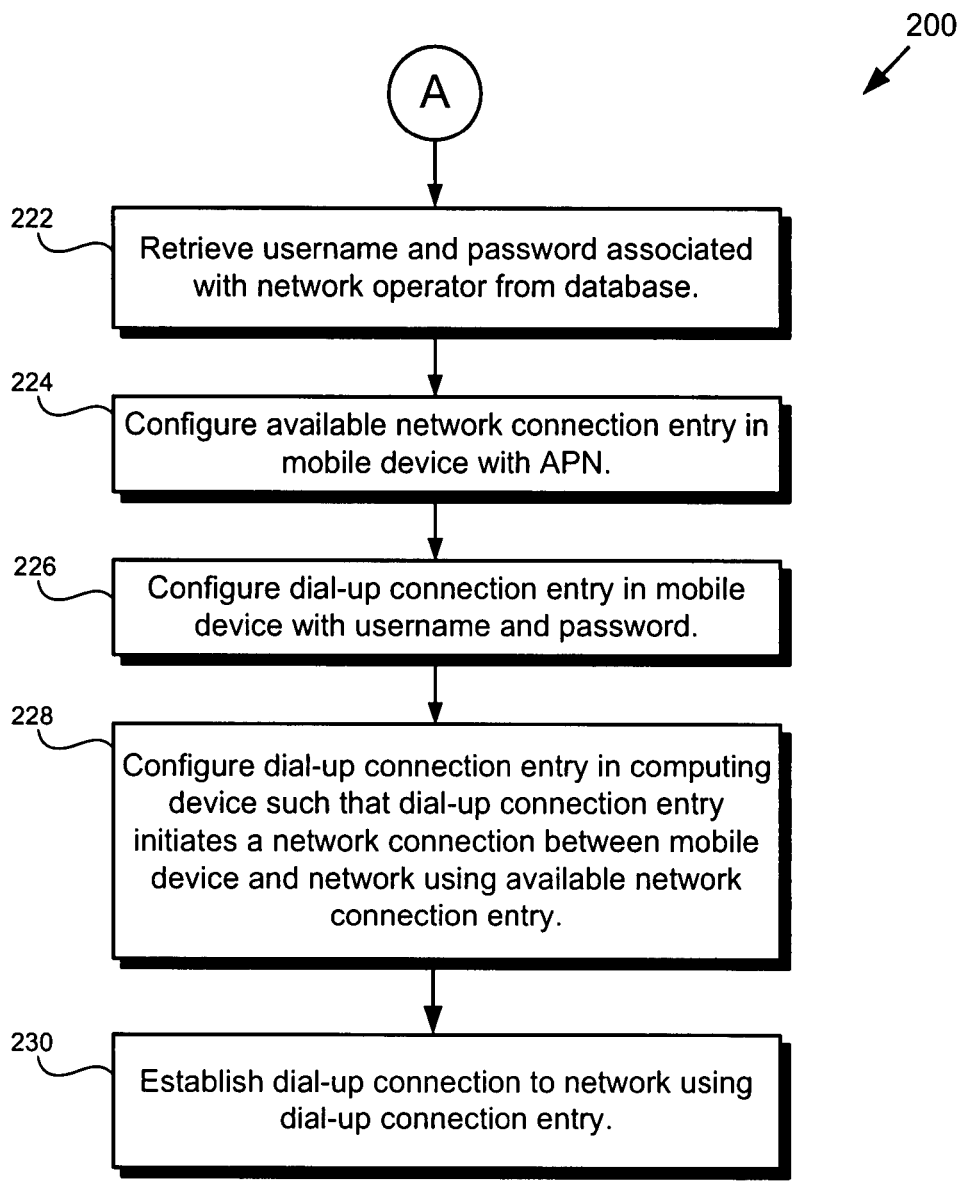

FIGS. 2A and 2B illustrate flowchart 200 for performing an example method for use by a computing device for automatically establishing a dial-up connection to a network through a mobile device, according to one embodiment of the present invention. With reference to FIG. 1 and as shown in FIG. 2A, at step 202 of flowchart 200, communication link 117 is established with mobile device 118. At step 204, mobile device 118 is queried for network identification data. At step 205, the network identification data from mobile device 118 is received. Then at step 206, the type of network 130 is determined using the network identification data. At decision step 208, it is determined whether network 130 is a GSM network. If network 130 is not a GSM network, then at step 210, a dial-up connection entry (e.g., RAS entry 106) in computing device 100 is configured based on the type of network 130. Thereafter, a dial-up connection is established to network 130 using the dial-up connection entry.

However, if network 130 is a GSM network, then at step 214, the network operator of network 130 is determined. Then, at step 216, mobile device 118 is queried to determine the availability of a network connection entry in mobile device 118. At step 218, an available network connection entry is selected. At step 220, an Access Point Name ("APN") associated with the network operator is retrieved from database 110. Referring now to FIG. 2B, at step 222, a user name and password associated with the network operator are retrieved from database 110. At step 224, the available network connection entry in mobile device 118 is configured with the APN. At step 226, the dial-up connection entry in mobile device 118 is configured with the user name and password. Thereafter, at step 228, the dial-up connection entry is configured such that the dial-up connection entry initiates a network connection between mobile device 118 and network 130 using the available network connection entry identified in step 218. At step 230, a dial-up connection is established using the dial-up connection entry (e.g., RAS entry 106).

Thus, transceiver control subsystem 102 of the invention can automatically determine the network specific information associated with a network of a mobile device, and can configure both the mobile device and a computing device to automatically establish a dial-up connection to the network. As such, the invention allows a user to advantageously establish a dial-up connection to a network through a mobile device in one convenient step (i.e., by initiating user interface application 116). Consequently, the invention allows a user to avoid having to determine network specific information, such as a dial string, a user name, a password, and an APN associated with a network operator, which can be both difficult and inconvenient to determine. Moreover, the invention allows a user to quickly and automatically establish a dial-up connection without requiring the user to manually configure a dial-up connection entry or a network connection entry.

From the above description of the invention it is manifest that various techniques can be used for implementing the concepts of the present invention without departing from its scope. Moreover, while the invention has been described with specific reference to certain embodiments, a person of ordinary skill in the art would recognize that changes could be made in form and detail without departing from the spirit and the scope of the invention. The described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A method for use by a computing device for automatically establishing a dial-up connection to a network through a mobile device, said method comprising:
    establishing a communication link with said mobile device for automatically configuring a dial-up connection entry in said computing device;
    querying said mobile device for network identification data;
    receiving said network identification data from said mobile device in response to said querying, said network identification data indicating a type of said network from a plurality of network types including a Code Division Multiple Access ("CDMA") network and Global System for Mobile ("GSM") communications network;
    configuring said dial-up connection entry in said computing device based on said type of said network;
    establishing said dial-up connection to said network via said mobile device using said dial-up connection entry configured in said computing device.

2. The method of claim 1 wherein said configuring configures said dial-up connection entry differently if said type of said network is said CDMA network than if said type of said network is said GSM communications network.

3. The method of claim 1 further comprising:
    if said type of said network is said GSM communications network:
        determining a network operator of said network;
        selecting an available network connection entry in said mobile device;
        retrieving an Access Point Name ("APN") associated with said network operator from a database; and
        configuring said available network connection entry with said APN prior to said configuring said dial-up connection entry.

4. The method of claim 3 further comprising:
    retrieving a user name and a password associated with said network operator from said database; and
    configuring said available network connection entry with said user name and said password.

5. The method of claim 3 wherein said dial-up connection entry in said computing device is configured to initiate a network connection between said mobile device and said network using said available network connection entry.

6. The method of claim 1 wherein said establishing said dial-up connection to said network using said dial-up connection entry is performed by transmitting an AT command to said mobile device.

7. The method of claim 1 wherein said communication link is one of a Bluetooth communication link, a Universal Serial Bus ("USB") communication link, or an Infrared Data Association ("IrDA") communication link.

8. The method of claim 1 wherein said dial-up connection entry is a Remote Access Server ("RAS") entry.

9. The method of claim 1 wherein said mobile device is a cellular telephone.

10. A computing device configured to automatically establish a dial-up connection to a network through a mobile device, said computing device comprising:
    a transceiver configured to establish a communication link with said mobile device for automatically configuring a dial-up connection entry in said computing device, said transceiver being configured to query said mobile device for network identification data, said transceiver being configured to receive said network identification data from said mobile device in response to said query, said network identification data indicating a type of said network from a plurality of network types including a Code Division Multiple Access ("CDMA") network and Global System for Mobile ("GSM") communications network;

a transceiver control subsystem for configuring said dial-up connection entry based on said type of said network;

wherein said transceiver control subsystem is configured to use said dial-up connection entry configured in said computing device to establish said dial-up connection to said network via said mobile device.

11. The computing device of claim 10 wherein said transceiver control subsystem is for configuring said dial-up connection entry differently if said type of said network is said CDMA network than if said type of said network is said GSM communications network.

12. The computing device of claim 10 wherein if type of said network is said GSM communications network, the computing device is further configured to:

determine a network operator of said network;

select an available network connection entry in said mobile device;

retrieve an Access Point Name ("APN") associated with said network operator from a database; and configure said available network connection entry with said APN prior to said configuring said dial-up connection entry.

13. The computing device of claim 12 wherein said transceiver control subsystem configures said available network connection entry with said APN.

14. The computing device of claim 13 wherein said transceiver control subsystem is further configured to retrieve a user name and a password associated with said network operator from said database and to configure said available network connection entry with said user name and said password.

15. The computing device of claim 12 wherein said dial-up connection entry in said computing device is configured to initiate a network connection between said mobile device and said network using said available network connection entry.

16. The computing device of claim 10 wherein said transceiver is one of a Bluetooth transceiver, a Universal Serial Bus ("USB") transceiver, or an Infrared Data Association ("IrDA") transceiver.

17. The computing device of claim 10 wherein said mobile device is a cellular telephone.

18. The computing device of claim 10 wherein said computing device is one of a desktop computer or a laptop computer.

* * * * *

UNITED STATES PATENT AND TRADEMARK OFFICE
CERTIFICATE OF CORRECTION

PATENT NO. : 8,260,248 B2
APPLICATION NO. : 11/881689
DATED : September 4, 2012
INVENTOR(S) : Zhodzishsky et al.

Page 1 of 1

It is certified that error appears in the above-identified patent and that said Letters Patent is hereby corrected as shown below:

In the claims, column 7, line 19, "if type" should be changed to --if said type--.

Signed and Sealed this
Eighteenth Day of February, 2014

Michelle K. Lee
*Deputy Director of the United States Patent and Trademark Office*